350-3.72
2/20/79    OR    4,140,362

United States Patent [19]
Tien

[11] 4,140,362
[45] Feb. 20, 1979

[54] FORMING FOCUSING DIFFRACTION GRATINGS FOR INTEGRATED OPTICS

[75] Inventor: Ping K. Tien, Chatham Township, Morris County, N.J.

[73] Assignee: Bell Telephone Laboratories, Incorporated, Murray Hill, N.J.

[21] Appl. No.: 815,721

[22] Filed: Jul. 14, 1977

[51] Int. Cl.² ............................ G03H 1/04; G02B 5/32
[52] U.S. Cl. ................................. 350/3.72; 350/162 R
[58] Field of Search ........................... 350/3.70–3.72, 350/3.79, 162 R, 96.19

[56] References Cited
U.S. PATENT DOCUMENTS

| 3,578,845 | 5/1971 | Brooks ................................. 350/3.72 |
| 3,809,453 | 5/1974 | Ruell et al. ......................... 350/3.79 |
| 3,905,674 | 9/1975 | Ruell et al. ......................... 350/3.79 |

OTHER PUBLICATIONS

Katzir et al., *IEEE Journal of Quantum Electronics*, vol. QE-13, No. 4, Apr. 1977, pp. 296–304.

Primary Examiner—Ronald J. Stern
Attorney, Agent, or Firm—Daniel D. Dubosky

[57] ABSTRACT

An apparatus is disclosed for making unchirped holographic diffraction gratings that are formed from curved lines in a thin film. The gratings so made focus as well as reflect light that is confined to the film incorporating the grating.

10 Claims, 15 Drawing Figures

OPTICAL SYSTEM

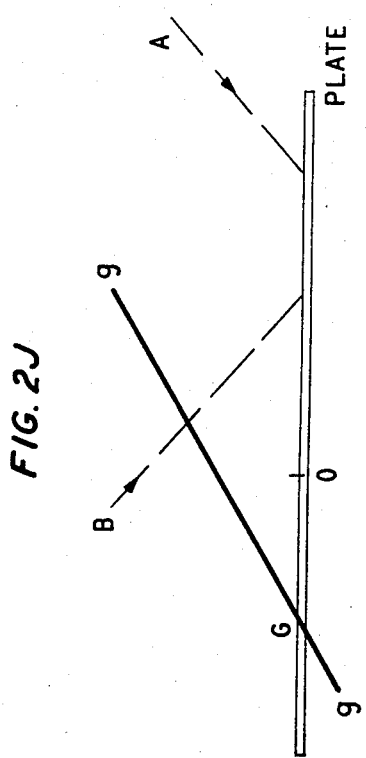
FIG. 2J
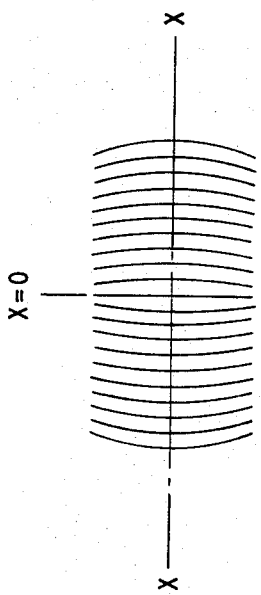
FIG. 2L
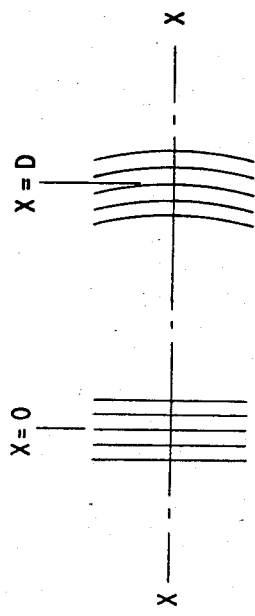
FIG. 2I
FIG. 2K

FORMING FOCUSING DIFFRACTION GRATINGS FOR INTEGRATED OPTICS

BACKGROUND OF THE INVENTION

Gratings have been incorporated in integrated optics devices for several purposes, including the fabrication of distributed feedback lasers, light-wave couplers, and band-rejection filters. Integrated-optics gratings known to the prior art were composed at straight lines, and therefore could not focus the light being processed. Gratings that combine focusing and diffraction were known to be desirable, but the prior art was unable to produce them.

The closest prior art that has come to our attention is a method and apparatus for producing curved-line holographic gratings that have unequally spaced, or chirped, lines (U.S. Pat. No. 3,578,845, issued on May 18, 1971 to K. E. Brooks et al). This reference teaches the production of gratings that focus light that propagates into and out of the plane of the grating. It does not teach the relative orientation of laser beams and focal lines that are required in order to produce curved-line gratings that will function in integrated optics devices.

SUMMARY OF THE INVENTION

The invention relates to a method and apparatus for producing unchirped, curved-line, holographic diffraction gratings in a thin film, which gratings will focus as well as diffract light that is confined to the film in which the grating is formed. (In integrated optics, the film containing the light is called the optical waveguide, and the waveguide with a grating in it is called a corrugated waveguide.) The gratings are made by forming an interference pattern in a photosensitive material, fixing the interference pattern so formed and then using the fixed pattern as a mask for ion or chemical etching processes of conventional type to form corrugated waveguides.

One feature of the invention is the use of two cylindrically focused beams of coherent optical radiation for writing holographic diffraction gratings, the focal lines of which beams are oriented in a predetermined manner with respect to each other and with respect to the grating being written.

Another feature of the invention is the use of coplanar focal lines of the two beams oriented so that the plane which contains the focal lines also contains the axis of the grating, thereby providing uniform spacing between the grating lines.

Further features and advantages of the invention will become apparent from a study of the detailed description and of the drawings.

DETAILED DESCRIPTION

Figure 1A:
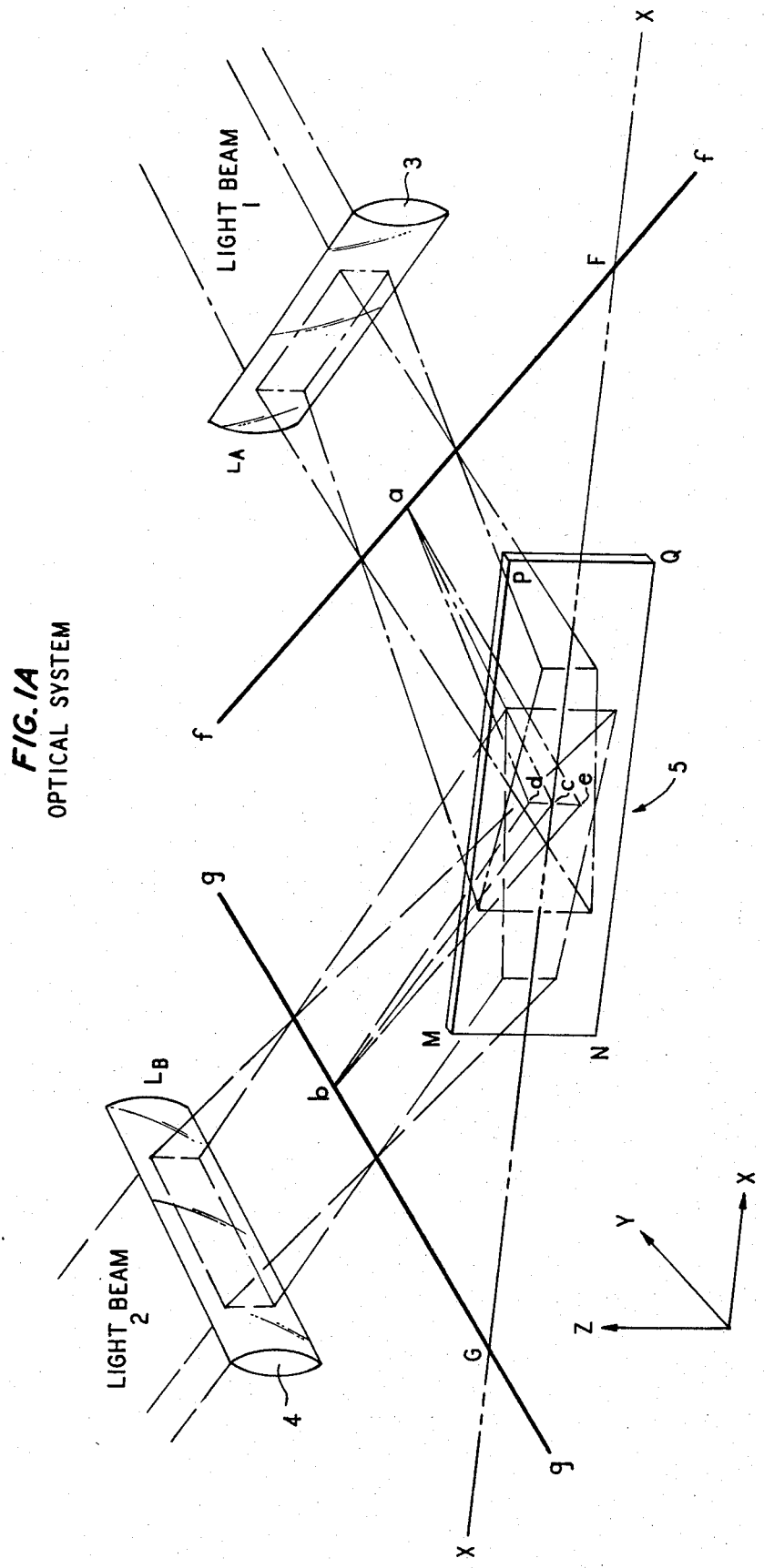
FIG. 1 shows an apparatus for forming gratings according to the invention.

The basic optical system used to form gratings according to the invention is shown in FIG. 1A. It involves two oblique coherent light beams 1 and 2, generated by conventional means not shown, focused by two cylindrical lenses 3 and 4, respectively. A curved-line grating is formed by recording the interference pattern of the two light beams on a photoresist plate 5. Plate 5 is in the (x - z) vertical plane with y = 0. Lenses 3 and 4 are centered in a horizontal plane at z = 0, and the beams are also horizontal. Lines bc and ac, along the center of the two beams are thus also horizontal, and planes adce and bdce are vertical. Note that in this invention, lines f—f and g—g, the focal lines of beams 1 and 2 respectively, are horizontal and are not necessarily parallel to the plate. This is in contrast with the prior art apparatus of U.S. Pat. No. 3,578,845 referred to above in which focal lines would be oriented in the vertical direction and parallel to the photosensitive plate (see FIGS. 4 and 6 of U.S. Pat. No. 3,578,845). The relative orientation of these focal lines and their relationship with the plate 5 determine the type of grating that will be formed and are the key to the invention.

In FIG. 1A, the beams are shown as being centered in a horizontal plane at z = 0. The particular value of z and the choice of a horizontal planes are, of course arbitrarily chosen in order to make the illustration more comprehensible. The essential point is that the two incident beams are coplanar, i.e., they are centered about the same plane (the "beam plane"), and that plane is perpendicular to the plane of the photosensitive material. Since the focal lines f—f and g—g and lenses 3 and 4 are centered in their respective beams, they lie in the "beam plane" also. The above remarks hold true even if one or more of the beams is collimated and the corresponding focal line is theoretically at infinity. If one focal line lies at a great distance from the photosensitive plate, the beam plane is still unambiguously defined by the centers of the beams, the centers of the lenses and the other focal line.

In designing a grating, the curvature of each fringe and the spacing between fringes on the x axis must be specified. The curvature is specified by the lens formula:

$$C(\text{incident}) + C(\text{reflection}) = 2C(\text{fringe}), \tag{1}$$

where incident and reflection refers to the light being processed. The inter-fringe spacing is specified by the Bragg-reflection condition:

$$2\beta \cdot \hat{x} = mG \tag{2}$$

where $$\beta = 2\pi/\lambda, \quad G = 2\pi/d, \tag{3}$$

d is the inter-fringe spacing, m is an integer specifying the diffraction order, and $\lambda$ is the wavelength of the light beams 1 and 2.

Figure 1B:
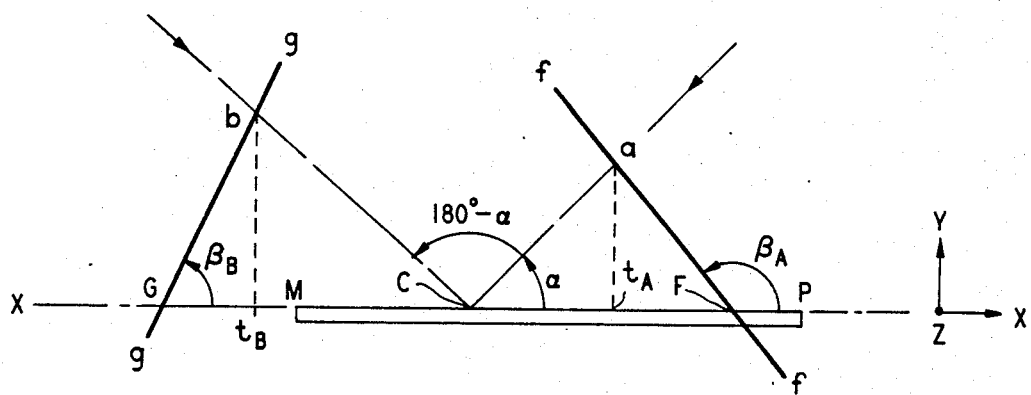

The curvature of the fringe may also be expressed in terms of the beams 1 and 2 used to write the grating. In FIG. 1B, which shows a view looking down on the x-y plane of FIG. 1A, $\overline{ac}$ is the distance along the direction of propagation of beam 1 from focal line f—f to the x axis, and $\overline{bc}$ is the corresponding distance for beam 2.

The curvature of the fringe may be expressed in terms of the curvatures of the two beams.

$$\begin{aligned} C &= C_A - C_B \\ &= \frac{1}{2\cos\alpha}\left(\frac{1}{ac} - \frac{1}{bc}\right) \end{aligned} \tag{4}$$

-continued $$= \frac{-1}{2\cot\alpha}\left[\frac{\cot\alpha - \cot\beta_A}{x - \Delta} + \frac{\cot\alpha + \cot\beta_B}{x}\right]$$

where $x = 0$ at G, $\Delta = $ the distance $\overline{F\text{-}G}$, and $\alpha$ is the angle between the direction of propagation of beam 1 and the x-axis. Equations 1 through 4 permit the design of gratings to accomplish the various tasks disclosed above.

Figure 1C:
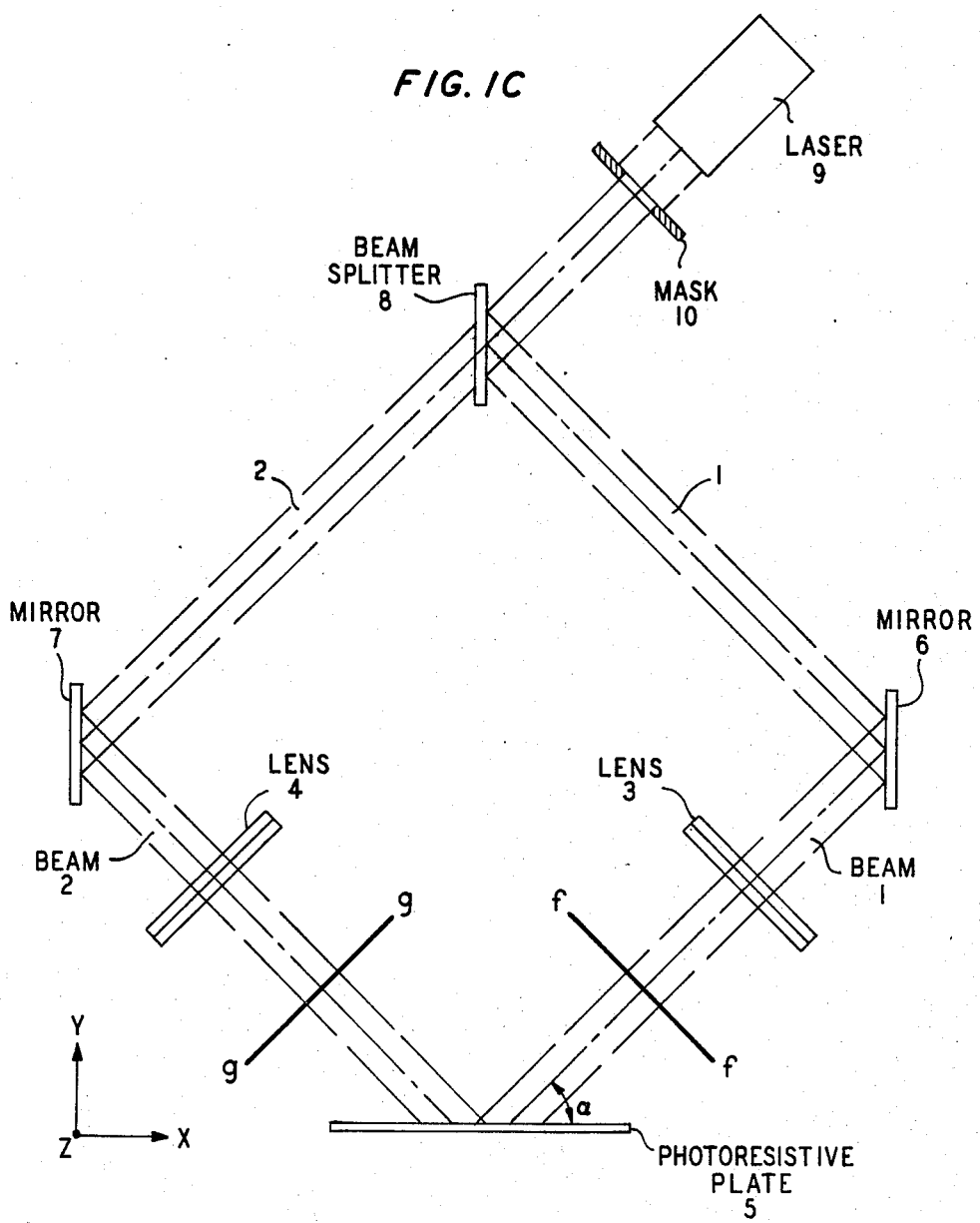

FIG. 1C shows a plan view looking down on the x-y plane of the apparatus shown in FIG. 1A, further including the source of beams 1 and 2. For ease of illustration, the particular case where the beams intersect the x-axis at an angle of 45 degrees is shown. Other configurations of beam angle and therefore of mirror position will be required to form gratings for various purposes and may be readily calculated by those skilled in the art from the information disclosed in this application.

In FIG. 1C, laser 9 generates a parallel beam of coherent optical radiation. It may be desired to employ a mask 10 to define the shape of the beam envelope (rectangular, square, et cetera). The beam from laser 9 is split by beamsplitter 8, forming beams 1 and 2. These two beams are reflected by mirrors 6 and 7 into lenses 3 and 4 respectively. The position of all these elements will, of course, be adjusted to give the angles between beams 1 and 2 and plate 5 and the positions of focal lines f—f and g—g that are required by Equations 1 through 4 to provide the grating parameters that are desired.

Figure 2A:
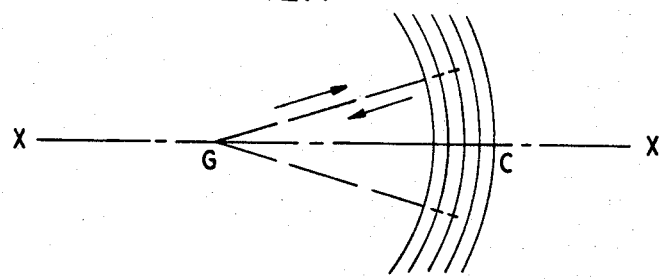
FIG. 2 shows different types of gratings according to the invention and the methods employed in forming these gratings.
Figure 2B:
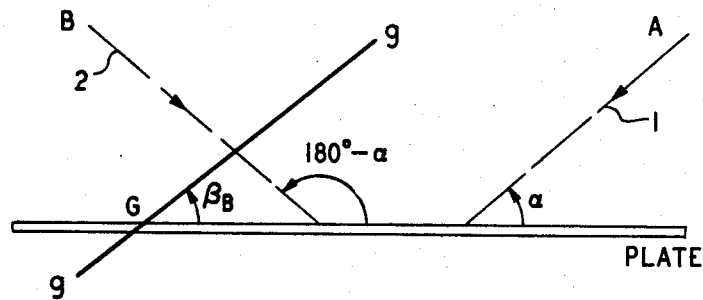

In the first example of gratings design, shown in FIG. 2A, a grating is used to reflect and focus light emitting from a point source G in a waveguide back to that same point. FIG. 2B illustrates the optics used, looking down on the x-y plane. In this and the following cases, the left-hand figure shows the grating in operation, and the right-hand figure shows the parameters used to write the grating. Beam 1, focused at infinity, crosses the x axis at an angle $\alpha$. Beam 2 is focused at line g—g, which crosses the x axis at point G, the same point as the focus, at an angle $\beta_B$. In general, line g—g is not at right angles to the direction of propagation of beam 2, which is $180 - \alpha$. Note that in FIG. 2B, the lines 1 and 2 illustrate the center lines of the beams 1 and 2, respectively. The beams are wide and they overlap one another as they are projected to the plate forming an interference pattern.

Figure 2C:
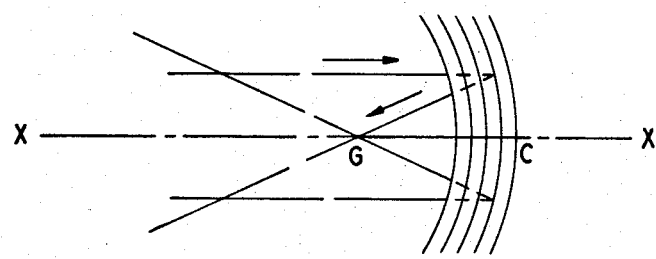
Figure 2D:
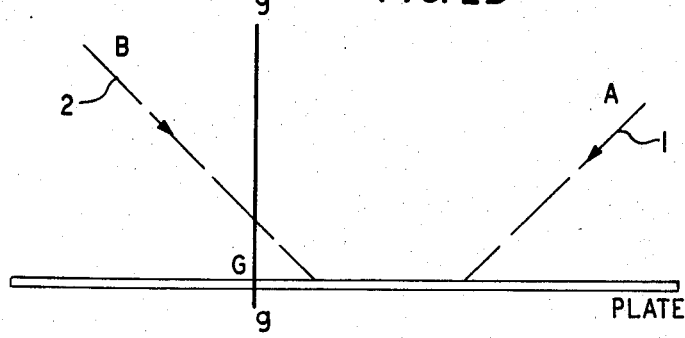

In the second type of grating, a plane parallel beam in a waveguide is focused to a point, at G in the same waveguide (FIG. 2C). In FIG. 2D, we see that beam 1 (plane-parallel) is oriented as before, and that g—g is at right angles to the x̄ axis, passing through point G. Beam 2 has the same direction of propagation as in FIG. 2B.

Figure 2F:
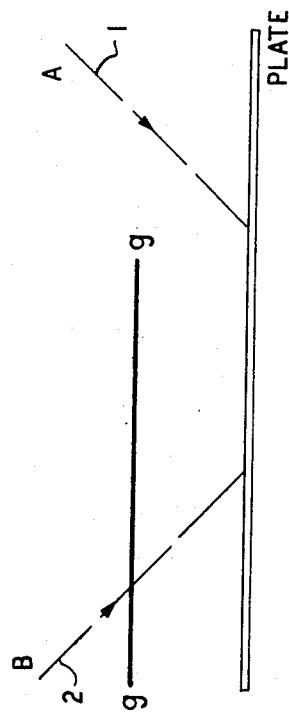
Figure 2H:
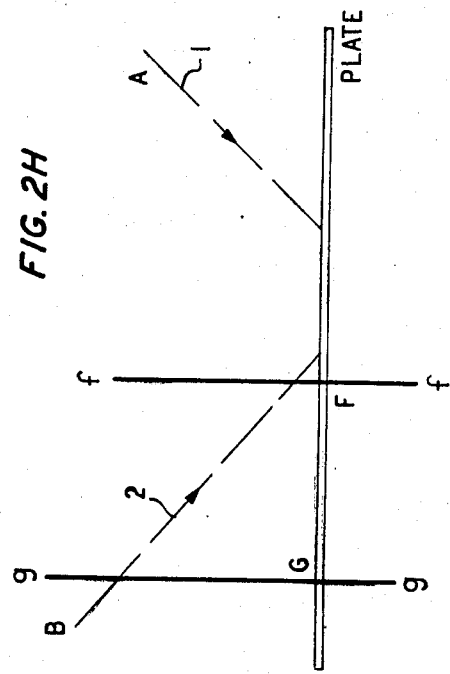
Figure 2E:
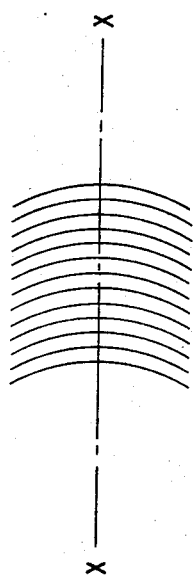

In the third grating as shown in FIG. 2E, we use the grating to form a lens-like medium, in which all the grating lines have the same curvature. To produce the grating of FIG. 2E, we place the focal line g—g parallel to the x axis as shown in FIG. 2F. The other parameters of the two beams are the same as in the previous examples of FIGS. 2B and 2D.

Figure 2G:
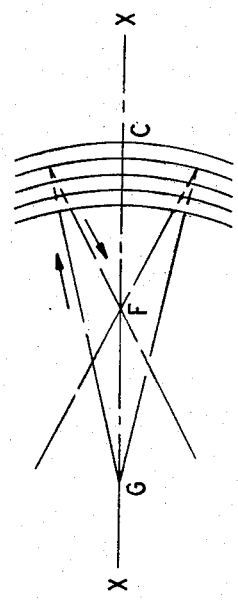

In the fourth type of grating (FIG. 2G), light in a waveguide is focused from point G on the x axis to point F, also on the x axis. To produce the grating of FIG. 2G, both beams 1 and 2 are focused at finite distances, both focal lines being perpendicular to the x axis are shown in FIG. 2H. Line f—f intersects the axis at point F, the image point, and line g—g intersects the axis at point G, the object point.

In addition to the above example, gratings constructed according to the invention may be used to form resonators in diode-lasers. Consider a Hermite-Gaussian beam propagating in a waveguide along the x axis, the curvature of the wave front varies in x as $$C = x/(N^2\beta^2 a_o^4 + x^2) \qquad (5)$$

where N is the mode index of the waveguide, $\beta = (2\pi)/\lambda$, and $a_o$ is the radius of the beam at $x = 0$. A requirement for the formation of a grating resonator for such a beam is that the curvatures of the incident and reflected waves, given by Equation 5 as well as the curvatures of the fringes in the grating, agree with Equation 4.

As an illustration, we consider a resonator for an AlGAsSb Bragg-reflector laser shown in FIG. 2I. The gratings used as left and right reflectors are each 100 $\mu$m long. The center of the left reflector is located at $x = 0$, where $C = 0$, and the center of the right reflector is located at $x = D = 600$ $\mu$m. The two reflectors are formed separately, the parameters of the right reflector being shown for purposes of illustration. Putting $x = D + \Delta x$ in Equation 4, and taking $D = 600$ $\mu$m, $N = 3.6$, $\lambda = 1.3$ $\mu$m and $a_o = 4$ $\mu$m, we find $$C \neq -1.37 \times 10^{-3}(1 - 0.93 \times 10^{-3}\Delta x)\ \mu m^{-1}.$$

This curvature may be realized by the arrangement shown in FIG. 2J. Here, $C_A = 0$, $\alpha = 40.13$, $\beta_B = 28.53$, and C is located 931 $\mu$m from D.

FIG. 2K shows another grating-resonator designed for a distributed feedback laser. The grating is 350 $\mu$m long and centered at $x = 0$. Two cylindrically focused beams are used, as shown in FIG. 2L. The parameters that match the requirements of Equation 4 satisfactorily are: $N = 36$, $\lambda = 1.3$ $\mu$m, $a_o = 5$ $\mu$m, $\alpha = 40.1$, $\beta_A = -156.33$, $\beta_A = -23.67$, and G and F are located at $x = 583.33\mu$ and $+583.33$ $\mu$m.

The method discussed above applies equally well to forming unstable resonators, in which the light being reflected travels along a different path on each pass between the two ends of the grating.

One practical problem that may be overcome arises from the distortions that are introduced in the cylindrical wavefront by placing the focal line at an angle other than normal to the direction of propagation. The use of only the center portion of the grating reduces this effect. Secondly, the intensities of the beams vary somewhat along the x axis, tending to overexpose parts of the photoresist plate. This effect may be reduced by the use of spatially varied neutral density filters that may be empirically adjusted to provide a uniform exposure.

What is claim is:

1. An apparatus for forming an unchirped optical interference pattern with curved lines in a planar photosensitive material comprising:
   means for generating first and second beams of coherent optical radiations, said beams being positioned such that the center of said first beam and the center of said second beam define a first plane;
   means for supporting a planar piece of photosensitive material oriented in a second plane substantially perpendicular to said first plane thereby defining a line of intersection between said first plane and said second plane, said first and second beams thereby establishing a two-dimensional interference pattern in said second plane that is symmetrical along said line of intersections with respect to directions that are perpendicular to said line of intersection;

characterized in that, a cylindrical lens is positioned in the path of at least one of said beams and oriented such that said at least one of said beams is focused into a first focal line which lies in said first plane.

2. An apparatus according to claim 1 in which said first focal line is substantially perpendicular to said second plane.

3. An apparatus as defined in claim 1 wherein a second cylindrical lens is positioned in the path of the other one of said beams and oriented such that the other one of said beams is focused into a second focal line which lies in said first plane.

4. An apparatus according to claim 3 in which said first focal line and said second focal line are perpendicular to said second plane.

5. An apparatus according to claim 3 in which said first and second focal lines lie substantially behind said photosensitive material.

6. A method of forming a grating mask from which an unchirped holographic diffraction grating can be made comprising the steps of:

generating coplanar first and second beams of coherent optical radiation in a first plane, said beams being oriented such that the center of said first beam and the center of said second beam define a first plane, focusing said first beam using a cylindrical lens to a first focal line lying in said first plane and in a predetermined position relative to a planar piece of photosensitive material lying in a second plane oriented substantially perpendicular to said first plane, whereby said first and second beams form a two-dimensional interference pattern in said photosensitive material, and fixing said interference pattern to form a grating mask.

7. A method according to claim 6 in which said first beam is focused to a first focal line before said first beam strikes said photosensitive material.

8. A method according to claim 6 in which said first beam is focused to a first focal line substantially perpendicular to said second plane.

9. A method according to claim 6 in which said second beam is focused to a second focal line and said first and second focal lines are oriented substantially perpendicular to said second plane.

10. A method according to claim 6 in which said first and said second beams are focused to first and second focal lines lying substantially behind said photosensitive material.

* * * * *

UNITED STATES PATENT AND TRADEMARK OFFICE
CERTIFICATE OF CORRECTION

PATENT NO. : 4,140,362
DATED : February 20, 1979
INVENTOR(S) : Ping K. Tien

It is certified that error appears in the above-identified patent and that said Letters Patent are hereby corrected as shown below:

Column 3, line 67, "are" should read --as--.
Column 4, line 19, "AlGAsSb" should read --AlGaAsSb--; line 29, "C ≠" should read --C ∼--; line 29, "$10^{-3}\Delta ix$" should read --$10^{-3}\Delta x$--; line 39, "N = 36" should read --N = 3.6--; line 40, "$\beta_A$" should read --$\beta_B$--; line 41, "583.33µ" should read -- -583.33 µm--. Column 5, line 3, "intersections" should read --intersection--.

Signed and Sealed this

First Day of April 1980

[SEAL]

Attest:

SIDNEY A. DIAMOND

*Attesting Officer*  *Commissioner of Patents and Trademarks*